US012665183B2

(12) United States Patent
Shiba et al.

(10) Patent No.: US 12,665,183 B2
(45) Date of Patent: Jun. 23, 2026

(54) ION-CONDUCTIVE SOLID AND ALL-SOLID-STATE BATTERY

(71) Applicant: CANON OPTRON, INC., Ibaraki (JP)

(72) Inventors: Yoshitaka Shiba, Tochigi (JP); Noriko Sakamoto, Tochigi (JP); Takeshi Kobayashi, Ibaraki (JP); Saori Hashimoto, Tochigi (JP)

(73) Assignee: CANON OPTRON, INC., Ibaraki (JP)

( * ) Notice: Subject to any disclaimer, the term of this patent is extended or adjusted under 35 U.S.C. 154(b) by 504 days.

(21) Appl. No.: 18/242,204

(22) Filed: Sep. 5, 2023

(65) Prior Publication Data

US 2023/0411591 A1 Dec. 21, 2023

Related U.S. Application Data

(63) Continuation of application No. PCT/JP2021/045274, filed on Dec. 9, 2021.

(30) Foreign Application Priority Data

May 31, 2021 (JP) ................................. 2021-090936

(51) Int. Cl.
*H01M 4/131* (2010.01)
*H01M 10/0562* (2010.01)

(52) U.S. Cl.
CPC ....... *H01M 4/131* (2013.01); *H01M 10/0562* (2013.01)

(58) Field of Classification Search
CPC ........................... H01M 4/131; H01M 10/0562
See application file for complete search history.

(56) References Cited

U.S. PATENT DOCUMENTS

2022/0302497 A1 9/2022 Shiba et al.

FOREIGN PATENT DOCUMENTS

| JP | 2017-91953 | A | 5/2017 |
|----|-----------|---|--------|
| JP | 2017-91955 | A | 5/2017 |
| WO | 2022/254753 | A1 | 12/2022 |
| WO | 2022/254754 | A1 | 12/2022 |
| WO | 2022/254755 | A1 | 12/2022 |
| WO | 2022/254756 | A1 | 12/2022 |
| WO | 2022/254757 | A1 | 12/2022 |

OTHER PUBLICATIONS

Shiba et al., U.S. Appl. No. 18/460,986, filed Sep. 5, 2023.
Kobayashi et al., U.S. Appl. No. 18/242,209 filed Sep. 5, 2023.
Hashimoto et al., U.S. Appl. No. 18/460,974, filed Sep. 5, 2023.
Hashimoto et al., U.S. Appl. No. 18/460,956, filed Sep. 5, 2023.
International Search Report in International Application No. PCT/JP2021/045274 (Feb. 2022).
Toyoki Okumura et al., "All-Solid-State Lithium-Ion Battery Using Li2.2C0.8B0.2O3 Electrolyte," 288 Solid State Ionics 248-252 (2016).

*Primary Examiner* — Jane J Rhee

(74) *Attorney, Agent, or Firm* — Venable LLP

(57) ABSTRACT

An ion conductive solid that can be produced by heat treatment at low temperature and has a high ion conductivity; and an all-solid-state battery comprising the ion conductive solid, and the ion conductive solid comprising an oxide represented by Formula $Li_{6-x-y-z}Y_{1-y-z}C_xZr_yCe_zB_{3-x}O_9$, in formula, x is a real number satisfying $0.010 \leq x \leq 1.500$, y is a real number satisfying $0.000 \leq y \leq 0.400$, and z is a real number satisfying $0.000 \leq z \leq 0.400$.

6 Claims, No Drawings

ION-CONDUCTIVE SOLID AND ALL-SOLID-STATE BATTERY

CROSS REFERENCE TO RELATED APPLICATIONS

This application is a Continuation of PCT International Application No. PCT/JP2021/045274, filed on Dec. 9, 2021, which is claiming priority of Japanese Patent Application No. 2021-090936, filed on May 31, 2021, all of which are hereby expressly incorporated by reference into the present application.

BACKGROUND OF THE INVENTION

Field of the Invention

The present disclosure relates to an ion conductive solid and an all-solid-state battery.

Description of the Related Art

Conventionally, light-weight and high-capacity lithium ion secondary batteries have been included in mobile devices such as smartphones and notebook computers, and transport equipment such as electric vehicles and hybrid electric vehicles.

However, since liquids containing combustible solvents have been used as electrolytes in conventional lithium ion secondary batteries, the leakage of the combustible solvents and ignition in the case of the short circuit of the batteries have been feared. Thus, secondary batteries using, as electrolytes, ion conductive solids different from the liquid electrolytes, to secure safety, have received attention in recent years. Such secondary batteries have been called all-solid-state batteries.

Solid electrolytes such as oxide-based solid electrolytes and sulfide-based solid electrolytes have been widely known as the electrolytes used in the all-solid-state batteries. Among them, the oxide-based solid electrolytes do not react with moisture in atmosphere, and do not generate hydrogen sulfide. Thus, the oxide-based solid electrolytes are safer than the sulfide-based solid electrolytes.

Such an all-solid-state battery includes: a positive electrode comprising a positive electrode active material; a negative electrode comprising a negative electrode active material; an electrolyte that is placed between the positive electrode and the negative electrode, and includes an ion conductive solid; and, if necessary, a current collector (the positive electrode active material and the negative electrode active material are collectively referred to as "electrode active material"). In a case in which the all-solid-state battery is produced using an oxide-based solid electrolyte, heat treatment is performed to reduce the contact resistance between the particles of an oxide-based material included in the solid electrolyte. However, in a conventional oxide-based solid electrolyte, a high temperature of 900° C. or more is required in the heat treatment, and the solid electrolyte and the electrode active material may therefore react to form a high-resistance phase. The high-resistance phase may lead to a decrease in the ionic conductivity of the ion conductive solid, and in turn to a decrease in the output of the all-solid-state battery.

Examples of oxide-based solid electrolytes that can be produced by heat treatment at a temperature of less than 900° C. include $Li_{2+x}C_{1-x}B_xO_3$ (Solid State Ionic 288 (2016) 248-252).

SUMMARY OF THE INVENTION

The present disclosure provides: an ion conductive solid that can be produced by heat treatment at low temperature, and that exhibits a high ionic conductivity; and an all-solid-state battery comprising the ion conductive solid.

An ion conductive solid of the present disclosure is an ion-conductive solid comprising an oxide represented by Formula $Li_{6-x-y-z}Y_{1-y-z}C_xZr_yCeB_{3-x}O_9$, wherein in the formula, x, y and z are real numbers satisfying $0.010 \leq x \leq 1.500$, $0.000 \leq y \leq 0.400$, and $0.000 \leq z \leq 0.400$.

Further, an all-solid-state battery of the present disclosure is an all-solid-state battery, comprising at least:

a positive electrode;

a negative electrode; and an electrolyte, wherein at least one selected from the group consisting of the positive electrode, the negative electrode, and the electrolyte comprises the ion conductive solid of present disclosure.

In accordance with one aspect of the present disclosure, there can be obtained: an ion conductive solid that can be produced by heat treatment at low temperature, and that exhibits a high ionic conductivity; and an all-solid-state battery comprising the ion conductive solid. Further features of the present disclosure will become apparent from the following description of exemplary embodiments.

DESCRIPTION OF EMBODIMENTS

In the present disclosure, a description of "XX or more and YY or less" or "XX to YY" representing a numerical range means a numerical range including lower and upper limits which are end points, unless otherwise specified. Also, when a numerical range is described in a stepwise manner, the upper and lower limits of each numerical range can be arbitrarily combined.

Further, in the present disclosure, a "solid" refers to the state of matter having certain shape and volume, in the three states of matter, and a powder state is included in the "solid".

An ion conductive solid of the present disclosure is an ion-conductive solid comprising an oxide represented by Formula $Li_{6-x-y-z}Y_{1-y-z}C_xZr_yCe_zB_{3-x}O_9$.

In the formula, x, y and z are real numbers satisfying $0.010 \leq x \leq 1.500$, $0.000 \leq y \leq 0.400$, and $0.000 \leq z \leq 0.400$.

As the reason why the ion conductivity is improved in the ion conductive solid comprising an oxide represented by the Formula, the present inventors presume as follows.

When a part of B of a trivalent element is substituted with C of a tetravalent element within the scope of the present disclosure, the balance of electric charges to be adjusted by the substitution between the elements having different valances, and therefore resulting in a state in which $Li^+$ in the crystal lattice is deficient. Since $Li^+$ neighboring on a place in which $Li^+$ is deficient moves to fill the place, the ionic conductivity is improved.

The ion conductive solid of the present disclosure preferably comprises a monoclinic type crystalline structure. With an ion conductive solid comprising a monoclinic type crystalline structure, a lattice constant is influenced to also influence a lattice volume and to be able to further influence an ionic conductivity, in the case of substituting a part of $B^{3+}$ with $C^{4+}$ which is an element of which the valance is more than that of $B^{3+}$ within the scope of the present disclosure, as compared with $Li_{6-y-z}Y_{1-y-z}Zr_yCe_zB_3O_9$ (i.e., the case of x=0.000, 0.000≤y≤0.400, and 0.000≤z≤0.400) or $Li_6YB_3O_9$ (i.e., the case of x=y=z=0.000) comprising none of C.

In X-ray diffraction analysis (which will be hereinafter also referred to simply as "XRD") using a CuKα ray, a diffraction peak appearing in the vicinity of 2θ=28° can vary according to the composition of the ion conductive solid.

The ion conductive solid of the present disclosure preferably exhibits a diffraction peak in the range of 27.91°≤2θ≤28.04° in XRD using a CuKα ray.

The position of the diffraction peak appearing in the vicinity of 2θ=28° in XRD using a CuKα ray can be controlled by adjusting the values of x, y, and z in the above formula.

For the ion conductive solid of the present disclosure, V preferably satisfies 752.59 Å³≤V≤758.51 Å³, where V represents the lattice volume of the ion conductive solid.

The lattice volume of the ion conductive solid can be controlled by adjusting the values of x, y, and z in the above formula.

In the above formula, x is a real number satisfying 0.010≤x≤1.500.

x satisfies 0.010≤x≤1.500, preferably 0.010≤x≤0.900, more preferably 0.010≤x≤0.600, further preferably 0.010≤x≤0.300, and in particular preferably 0.030≤x≤0.100.

In the above formula, y is a real number satisfying 0.000≤y≤0.400.

y satisfies 0.000≤y≤0.400, preferably 0.010≤y≤0.200, more preferably 0.010≤y≤0.100, and in particular preferably 0.030≤y≤0.100.

In the above formula, z is a real number satisfying 0.000≤z≤0.400.

z satisfies 0.000≤z≤0.400, preferably 0.010≤z≤0.200, more preferably 0.010≤z≤0.100, and in particular preferably 0.010≤z≤0.030.

In the above formula, x+y+z satisfies preferably 0.010≤x+y+z≤1.000, more preferably 0.050≤x+y+z≤0.500, and further preferably 0.050≤x+y+z≤0.200.

The ion conductive solid of the present disclosure may be allowed to be, for example, the following embodiments, but is not limited to the embodiments.

(1) It suffices that x satisfies 0.010≤x≤0.600, y satisfies 0.000≤y≤0.200, and z satisfies 0.000≤z≤0.200.

(2) It suffices that x satisfies 0.010≤x≤0.300, y satisfies 0.030≤y≤0.100, and z satisfies 0.010≤z≤0.030.

A method of producing the ion conductive solid of the present disclosure will now be described.

The method of producing the ion conductive solid of the present disclosure can be allowed to be, for example, the following aspect, but is not limited thereto.

A method for producing an ion conductive solid comprising an oxide represented by Formula $Li_{6-x-y-z}Y_{1-y-z}C_xZr_yCe_zB_{3-x}O_9$, may have a primary baking step of heat-treating a starting material, resulting from mixing so that the oxide represented by the above formula is obtained, at a temperature below the melting point of the oxide.

In the formula, x, y and z are real numbers satisfying 0.010≤x≤1.500, 0.000≤y≤0.400, and 0.000≤z≤0.400.

The method for producing the ion conductive solid of the present disclosure can include a primary baking step of weighing/mixing starting materials so as to obtain the oxide expressed by the above formula, and subjecting the starting materials to a heat treatment at a temperature below the melting point of the oxide, thereby producing an ion conductive solid comprising the oxide. Further, the producing method may include a secondary baking step of heat-treating the obtained ion conductive solid comprising the oxide at a temperature below the melting point of the oxide, and producing a sintered compact of the ion conductive solid comprising the oxide.

Below, the method for producing an ion conductive solid of the present disclosure including the primary baking step, and the secondary baking step will be described in detail. However, the present disclosure is not limited to the following producing method.

Primary Baking Step

In the primary baking step, starting materials such as $Li_3BO_3$, $H_3BO_3$, $Y_2O_3$, $ZrO_2$, $CeO_2$, and $Li_2CO_3$ of the chemical reagent grade were weighed in their respective stoichiometric amounts, and mixed so as to achieve Formula $Li_{6-x-y-z}Y_{1-y-z}C_xZr_yCe_zB_{3-x}O_9$ (where x, y and z are real numbers satisfying 0.010≤x≤1.500, 0.000≤y≤0.400, and 0.000≤z≤0.400).

An apparatus used in the mixture is not particularly limited. For example, a pulverizing-type mixer such as a planetary ball mill can be used as the apparatus. The material and capacity of a container used in the mixture, and the material and diameter of balls are not particularly limited, and can be selected as appropriate depending on the kinds and amounts of the starting materials used. As an example, a 45 mL container made of zirconia, and balls that have a diameter of 5 mm and is made of zirconia can be used. Moreover, the conditions of mixture treatment are not particularly limited but can be set at, for example, a rotation number of 50 rpm to 2000 rpm, and a time of 10 minutes to 60 minutes.

The powder mixture of each of the starting materials described above is obtained by the mixture treatment, and the obtained powder mixture is pressure-molded to make pellets. A known pressure molding method such as a cold uniaxial molding method or a cold isostatic pressure molding method can be used as a pressure molding method. The condition of the pressure molding in the primary baking step is not particularly limited but can be set at, for example, a pressure of 100 MPa to 200 MPa.

For the resulting pellet, using a baking apparatus such as an atmospheric baking apparatus, baking is performed. The temperature at which primary baking is performed for performing solid phase synthesis has no particular restriction so long as it is less than the melting point of an ion conductive solid represented by the Formula $Li_{6-x-y-z}Y_{1-y-z}C_xZr_yCe_zB_{3-x}O_9$. The temperature for performing primary baking can be set at, for example, less than 700° C., 680° C. or less, 670° C. or less, 660° C. or less, or 650° C. or less, and can be set at, for example, 500° C. or more. The numerical value ranges can be arbitrarily combined. At a temperature within the foregoing ranges, solid phase synthesis can be sufficiently performed. The time of the primary baking step has no particular restriction, and can be set at, for example, about 700 minutes to 750 minutes. By the primary baking step, it is possible to produce an ion conductive solid comprising the oxide represented by the Formula $Li_{6-x-y-z}Y_{1-y-z}C_xZr_yCeB_{3-x}O_9$. By pulverizing the ion conductive solid comprising the oxide using a mortar/pestle or a planetary mill, it is also possible to obtain a powder of the ion conductive solid comprising the oxide.

Secondary Baking Step

At the secondary baking step, at least one selected from the group consisting of the ion conductive solid comprising the oxide, and the powder of the ion conductive solid comprising the oxide obtained at the primary baking step is pressure molded, and baked, thereby obtaining a sintered compact of the ion conductive solid comprising the oxide of the present disclosure.

The pressure molding and the secondary baking may be performed at the same time using spark plasma sintering (which will also be hereinafter referred to as simply "SPS"), hot press, or the like. Alternatively, after producing a pellet with cold uniaxial molding, the secondary baking may be performed in an atmospheric atmosphere, an oxidizing atmosphere, a reducing atmosphere, or the like. Under the foregoing conditions, without causing melting due to the heat treatment, an ion conductive solid with a high ion conductivity can be obtained. The conditions for pressure molding at the secondary baking step has no particular restriction, and can be set at a pressure of, for example, 10 MPa to 100 MPa.

The temperature at which the secondary baking is performed is less than the melting point of the ion conductive solid represented by the Formula $Li_{6-x-y-z}Y_{1-y-z}C_xZr_yCe_zB_{3-x}O_9$. The temperature for performing the secondary baking is preferably less than 700° C., more preferably 680° C. or less, further preferably 670° C. or less, and in particular preferably 660° C. or less. The lower limit of the temperature has no particular restriction, is more preferably lower, and is, for example, 500° C. or more. The numerical value ranges can be arbitrarily combined, and can be set within the range of, for example, 500° C. or more and less than 700° C. Within the foregoing range, at the secondary baking step, the ion conductive solid comprising the oxide of the present disclosure can be prevented from being molten or dissolved, so that a sintered compact of the ion conductive solid comprising the oxide of the present disclosure can be obtained.

The time of the secondary baking step can be appropriately changed according to the temperature of the secondary baking, or the like, and is preferably 24 hours or less, and may be set at 1 hour or less. The time of the secondary baking step may be set at, for example, 5 minutes or more.

The method for cooling the sintered compact of the ion conductive solid comprising the oxide of the present disclosure obtained by the secondary baking step has no particular restriction. Natural cooling (intra-furnace cooling) may be performed, rapid cooling may be performed, more gradual cooling than natural cooling may be performed, and the sintered compact may be kept at a given temperature during cooling.

Then, a description will be given to an all-solid-state battery of the present disclosure.

The all-solid-state battery generally has a positive electrode, a negative electrode, an electrolyte comprising an ion conductive solid arranged between the positive electrode and the negative electrode, and if required, a collector.

The all-solid-state battery of the present disclosure is an all-solid-state battery comprising at least:

a positive electrode;

a negative electrode; and an electrolyte, wherein at least one selected from the group consisting of the positive electrode, the negative electrode, and the electrolyte comprises the ion conductive solid of the present disclosure.

The all-solid-state battery of the present disclosure may be a bulk-type battery, or may be a thin-film battery. The specific shape of the all-solid-state battery of the present disclosure is not particularly limited, but examples of the shape include coin, button, sheet, and layered shapes.

The all-solid-state battery of the present disclosure comprises the electrolyte. In the all-solid-state battery of the present disclosure, at least the electrolyte preferably comprises the ion conductive solid of the present disclosure.

The solid electrolyte in the all-solid-state battery of the present disclosure may comprise the ion conductive solid of the present disclosure, may comprise other ion conductive solids, and may comprise an ion liquid and a gel polymer. The other ion conductive solid is not particularly limited but may comprise an ion conductive solid that is usually used in an all-solid-state battery, for example, LiI, $Li_3PO_4$, $Li_7La_3Zr_2O_{12}$, or the like. The content of the ion conductive solid of the present disclosure in the electrolyte in the all-solid-state battery of the present disclosure is preferably 25 mass % or higher, more preferably 50 mass % or higher, still more preferably 75 mass % or higher, and particularly preferably 100 mass %.

The all-solid-state battery of the present disclosure has a positive electrode. The positive electrode may comprise a positive electrode active material, and may comprise the positive electrode active material and the ion conductive solid of the present disclosure. As the positive electrode active material, a known positive electrode active material such as a sulfide comprising a transition metal element, or an oxide including lithium and a transition metal element can be used without particular limitation.

Further, the positive electrode may comprise a binder, an electroconductive agent, and/or the like. Examples of the binder include polyvinylidene fluoride, polytetrafluoroethylene, and polyvinyl alcohol. Examples of the electroconductive agent include natural graphite, artificial graphite, acetylene black, and ethylene black.

The all-solid-state battery of the present disclosure comprises the negative electrode. The negative electrode may include the negative electrode active material and the ion conductive solid of the present disclosure. As the negative electrode active material, a known negative electrode active material such as an inorganic compound such as lithium, a lithium alloy, or a tin compound, a carbonaceous material that can absorb and release a lithium ion, or a conductive polymer can be used without particular limitation.

Further, the negative electrode may comprise a binder, an electroconductive agent, and/or the like. As the binder and the electroconductive agent, binders and electroconductive agents similar to those mentioned in the positive electrode can be used.

Herein, the electrode "include" the electrode active material denotes that the electrode has the electrode active material as a component/element/property. For example, the case where the electrode active material is included in the electrode, and the case where the electrode active material is coated on the electrode surface also correspond to the "include".

The positive electrode and the negative electrode can be obtained by a known method such as mixture, molding, heat treatment, or the like of starting materials. It is considered that, as a result, the ion conductive solid enters gaps and the like between such electrode active materials, to facilitate security of a conduction path for lithium ions. It is considered that the formation of a high-resistant phase generated by reaction between the ion conductive solid and the electrode active material can be suppressed because the ion conductive solid of the present disclosure can be produced by heat treatment at low temperature as compared to conventional technologies.

The above-described positive electrode and the above-described negative electrode may comprise the current collector. As the current collector, a known current collector such as aluminum, titanium, stainless steel, nickel, iron, baked carbon, a conductive polymer, or electrically conductive glass can be used. In addition, aluminum, copper, or the like, of which a surface is treated with carbon, nickel, titanium, silver, or the like for the purpose of improving adhesiveness, electrical conductivity, oxidation resistance, and the like, can be used as the current collector.

The all-solid-state battery of the present disclosure can be obtained by a known method in which, for example, the positive electrode, the solid electrolyte, and the negative electrode are layered, molded, and heat-treated. It is considered that the formation of a high-resistant phase generated by reaction between the ion conductive solid and the electrode active material can be suppressed because the ion conductive solid of the present disclosure can be produced by heat treatment at low temperature as compared to conventional technologies. Thus, it is considered that the all-solid-state battery superior in output characteristics can be obtained.

A method of measuring the composition and each physical property according to the present disclosure will now be described.

Method of Identification and Analyzing of C, Zr and Ce

The analysis of the composition of the ion conductive solid is performed by wavelength dispersion type fluorescent X-ray analysis (hereinafter also referred to as "XRF") using a sample solidified by a pressure-molding method. However, when the analysis is difficult due to a particle size effect and/or the like, it is preferable to vitrify the ion conductive solid by a glass bead technique, and to analyze the composition thereof by XRF. When the peak of yttrium and the peaks of Zr and Ce overlap with each other in XRF, the composition analysis is preferably performed by inductively coupled plasma atomic emission spectrochemical analysis (ICP-AES).

In the case of XRF, ZSX Primus II manufactured by Rigaku Corporation is used as an analysis apparatus. The conditions of the analysis are set at use of Rh as the negative electrode of an X-ray tube, vacuum atmosphere, an analysis diameter of 10 mm, an analysis range of 17 deg to 81 deg, a step of 0.01 deg, and a scanning speed of 5 sec/step. Moreover, the detection is performed by a proportional counter in the case of measuring a light element, while the detection is performed by a scintillation counter in the case of measuring a heavy element.

An element is identified based on the peak position of a spectrum obtained in XRF, and molar concentration ratios Y/C, Y/Zr, and Y/Ce are calculated based on a counting rate (unit: cps) which is the number of X-ray photons per unit time, to determine x, y, and z.

Measurement of X-Ray Diffraction Peak, and Calculation of Lattice Volume

D8 ADVANCE manufactured by BrukerAXS is used in the X-ray diffraction analysis of the ion conductive solid.

The X-ray diffraction analysis (XRD) is performed using a CuKα ray source with an analytical sample obtained by putting, in a holder, a powder obtained by pulverizing the ion conductive solid with a mortar and a pestle, and then pressing a glass flat plate against the powder from above to evenly spread the powder.

Temperature is set at room temperature (25° C.), an analysis range is set at 10 deg to 70 deg, a step is set at 0.007, and a scanning speed is set at 0.1 step/second.

In a diffraction curve obtained in XRD, 2θ of a peak top generated at 2θ=28.00±0.200 deg derived from $Li_6YB_3O_9$ is determined as a peak position.

The lattice volume of a crystal phase is calculated using the diffraction curve obtained in XRD and structural analysis software TOPAS manufactured by BrukerAXS. The lattice volume is calculated by fitting and analyzing, by TOPAS, the diffraction curve obtained in XRD and the diffraction pattern of the crystal phase having a monoclinic crystal structure.

EXAMPLES

Examples in which the ion conductive solid of the present disclosure was specifically produced and evaluated as sintered compacts are described below as Examples. The present disclosure is not limited to the following Examples.

Example 1

Primary Baking Step

Using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), and $Li_2CO_3$ (manufactured by NACALAI TESQUE, INC., purity 99.0 mass %) as starting materials, the respective starting materials were weighed in their respective stoichiometric amounts so as to achieve $Li_{5.950}YC_{0.050}B_{2.950}O_9$, and were mixed for 30 minutes at a disk rotation number of 300 rpm with a planetary mill P-7 manufactured by Fritsch Japan Co., Ltd. For the planetary mill, balls made of zirconia with a diameter of 5 mm and a 45-mL container were used.

After mixing, the mixed powder was subjected to cold uniaxial molding at 147 MPa using a 100 kN electric press P3052-10 manufactured by NPa SYSTEM CO., LTD., and was baked in an atmospheric atmosphere. The heating temperature was set at 650° C., and the retention time was set at 720 minutes.

The resulting ion conductive solid comprising the oxide was pulverized at a disk rotation number of 230 rpm with a planetary mill P-7 manufactured by Fritsch Japan Co., Ltd. for 180 minutes, thereby producing a powder of the ion conductive solid comprising the oxide.

Secondary Baking Step

A powder of the ion conductive solid comprising an oxide obtained as described above was subjected to molding, and secondary baking, thereby producing a sintered compact of the ion conductive solid comprising the oxide of Example 1. The secondary baking was carried out in an atmospheric atmosphere, and the heating temperature was set at 650° C., and the retention time was set at 720 minutes.

Example 2

A sintered compact of an ion conductive solid comprising an oxide of Example 2 was produced by the same step as that of Example 1, except for weighing the respective starting materials in their respective stoichiometric amounts so that x may become the value shown in Table 1.

Example 3

A sintered compact of an ion conductive solid comprising an oxide of Example 3 was produced by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), $Li_2CO_3$ (manufactured by NACALAI TESQUE, INC., purity 99.0 mass %), and $ZrO_2$ (manufactured by NIPPON DENKO CO., LTD., purity 99.9%) as starting materials, the respective starting materials were weighed in their respective stoichiometric amounts so as to achieve $Li_{5.750}Y_{0.800}C_{0.050}Zr_{0.200}B_{2.950}O_9$.

Example 4

A sintered compact of an ion conductive solid comprising an oxide of Example 4 was produced by the same step as that of Example 3, except for weighing the respective starting materials in their respective stoichiometric amounts so that x and y may become the values shown in Table 1.

Example 5

A sintered compact of an conductive solid comprising an oxide of Example 5 was produced by the same step as that of Example 1, except that using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), $Li_2CO_3$ (manufactured by NACALAI TESQUE, INC., purity 99.0 mass %), and $CeO_2$ (manufactured by Shin-Etsu Chemical Co., Ltd., purity 99.9%) as starting materials, the respective starting materials were weighed in their respective stoichiometric amounts so as to achieve $Li_{5.750}Y_{0.800}C_{0.050}Ce_{0.200}B_{2.950}O_9$.

Example 6

A sintered compact of an ion conductive solid comprising an oxide of Example 6 was produced by the same step as that of Example 5, except for weighing the respective starting materials in their respective stoichiometric amounts so that x and z may become the values shown in Table 1.

Example 7

A sintered compact of an ion conductive solid comprising an oxide of Example 7 was produced by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), $Li_2CO_3$ (manufactured by NACALAI TESQUE, INC., purity 99.0 mass %), and $ZrO_2$ (manufactured by NIPPON DENKO CO., LTD., purity 99.9%), and $CeO_2$ (manufactured by Shin-Etsu Chemical Co., Ltd., purity 99.9%) as starting materials, the respective starting materials were weighed in their respective stoichiometric amounts so as to achieve $Li_{5.915}Y_{0.965}C_{0.050}Zr_{0.010}Ce_{0.025}B_{2.950}O_9$.

Examples 8 to 19

Sintered compacts of an ion conductive solid comprising an oxide of Examples 8 to 19 were produced by the same step as that of Example 7, except for weighing the respective starting materials in their respective stoichiometric amounts so that x, y and z may become the values shown in Table 1.

Comparative Example 1

Primary Baking Step

An ion conductive solid and a powder of the ion conductive solid were produced by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), and $Y_2O_3$ (manufactured by Shin-Etsu Chemical Co., Ltd., purity 99.9 mass %) as starting materials, the respective starting materials were weighed in their respective stoichiometric amounts so as to achieve $Li_6YB_3O_9$.

Secondary Baking Step

The powder of the ion conductive solid obtained above was subjected to molding with spark plasma sintering (SPS), and secondary baking, thereby producing a sintered compact of an ion conductive solid comprising an oxide of Comparative Example 1. The heating temperature was set at 700° C., the pressure was set at 30 MPa, and the retention time was set at 10 minutes.

Comparative Example 2

Primary Baking Step

A solid and a powder of the solid were produced by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $ZrO_2$ (manufactured by NIPPON DENKO CO., LTD., purity 99.9%), and $CeO_2$ (manufactured by Shin-Etsu Chemical Co., Ltd., purity 99.9%) as starting materials, the respective starting materials were weighed in their respective stoichiometric amounts so as to achieve $Li_{5.000}Zr_{0.800}Ce_{0.200}B_3O_9$.

Secondary Baking Step

The powder of the solid obtained above was subjected to molding, and secondary baking, thereby producing a sintered compact comprising an oxide of Comparative Example 2. The secondary baking was carried out in an atmospheric atmosphere, the heating temperature was set at 550° C., and the retention time was set at 720 minutes.

The sintered compact of each ion conductive solid comprising an oxide of Examples 1 to 19 was subjected to composition analysis by the method. Further, for each sintered compact of each ion conductive solid comprising an oxide of Examples 1 to 19, the measurement of the X-ray diffraction peak and calculation of the lattice volume were performed. Still further, for the sintered compact of Examples 1 to 19, and Comparative Examples 1 and 2, the measurement of the ion conductivity was performed in the following manner.

The measurement method of the ion conductivity will be described below. Further, the obtained evaluation results are shown in Tables 1 and 2.

Measurement of Ion Conductivity

The two surfaces facing each other in parallel with each other, and each having a large area of the flat sheet-shaped sintered compact of the ion conductive solid comprising an oxide obtained by the secondary baking were polished with sandpaper. The dimensions of the flat sheet-shaped sintered compact of the ion conductive solid comprising an oxide can be set at, for example, 0.9 cm×0.9 cm×0.05 cm, but the dimensions are not limited thereto. Polishing was performed first at #500 for 15 minutes to 30 minutes, and then, at #1000 for 10 minutes to 20 minutes. Finally, polishing was performed at #2000 for 5 minutes to 10 minutes. When there are no visually noticeable unevenness and scratches on the polished surface, polishing was regarded as having been completed.

After polishing, using a sputtering apparatus SC-701MkII ADVANCE manufactured by SANYU ELECTRON CO., LTD., gold was deposited on the polished surface of the sintered compact of the ion conductive solid comprising an oxide. The deposition conditions were set for a measurement sample such that the process gas was Ar, the degree of vacuum was 2 Pa to 5 Pa, and the deposition time was 5 minutes. After deposition, alternating impedance measurement of the measurement sample was performed.

For the impedance measurement, an impedance/gain-phase analyzer SI1260 and a dielectric interface system 1296 (both manufactured by Solartron Co.) were used, and the measurement conditions were set such that the temperature was 27° C., the amplitude was 20 mV, and the frequency was 0.1 Hz to 1 MHz.

The resistance of the sintered compact of the ion conductive solid comprising an oxide was calculated using the Nyquist plot obtained by the impedance measurement, and software ZVIEW manufactured by Scribner Co. With the ZVIEW, the equivalent circuit corresponding to the measurement sample was set, and the equivalent circuit and the Nyquist plot were subjected to fitting and analysis, thereby calculating the resistance of the sintered compact of the ion conductive solid comprising an oxide. Using the calculated resistance, the thickness of the sintered compact of the ion conductive solid comprising an oxide, and the electrode area, the ion conductivity was calculated from the following equation.

Ion conductivity (S/cm)=thickness (cm) of sintered compact of ion conductive solid comprising oxide/(resistance (Ω) of sintered compact of ion conductive solid comprising oxide×electrode area (cm$^2$))

Results

Table 1 summarizes the stoichiometric amounts (the values of x, y, and z in Formula $Li_{6-x-y-z}Y_{1-y-z}C_xZr_yCeB_{3-x}O_9$) and the ion conductivity of the starting materials for producing the sintered compact of each ion conductive solid comprising an oxide of Examples 1 to 19 and Comparative Examples 1 and 2. Further, Table 2 summarizes the diffraction peak position and the lattice volume in each sintered compact obtained in Examples 1 to 19.

As a result of the composition analysis, it has been confirmed that all the sintered compacts of the ion conductive solids each comprising an oxide of Examples 1 to 19 and Comparative Example 1 have the compositions as the stoichiometric amounts shown in Table 1. Further, the sintered compact of each ion conductive solid comprising an oxide of Examples 1 to 19 was an ion conductive solid exhibiting a high ion conductivity even when baked at a temperature of less than 700° C. On the other hand, the main crystalline structure of the sintered compact of Comparative Example 2 was the one comprising $ZrO_2$ and $CeO_2$ used as the starting materials mixed therein.

TABLE 1

| | $Li_{6-x-y-z}Y_{1-y-z}C_xZr_yCe_zB_{3-x}O_9$ | | | x + | Ionic conductivity |
|---|---|---|---|---|---|
| | x | y | z | y + z | (S/cm) |
| Comparative Example 1 | 0.000 | 0.000 | 0.000 | 0.000 | $5.61 \times 10^{-11}$ |
| Comparative Example 2 | 0.000 | 0.800 | 0.200 | 1.000 | *1 |
| Example 1 | 0.050 | 0.000 | 0.000 | 0.050 | $3.39 \times 10^{-9}$ |
| Example 2 | 0.200 | 0.000 | 0.000 | 0.200 | $1.96 \times 10^{-8}$ |
| Example 3 | 0.050 | 0.200 | 0.000 | 0.250 | $1.26 \times 10^{-7}$ |
| Example 4 | 0.050 | 0.400 | 0.000 | 0.450 | $7.87 \times 10^{-8}$ |
| Example 5 | 0.050 | 0.000 | 0.200 | 0.250 | $2.01 \times 10^{-8}$ |
| Example 6 | 0.050 | 0.000 | 0.400 | 0.450 | $1.63 \times 10^{-9}$ |
| Example 7 | 0.050 | 0.010 | 0.025 | 0.085 | $4.99 \times 10^{-7}$ |
| Example 8 | 0.050 | 0.050 | 0.010 | 0.110 | $4.53 \times 10^{-6}$ |
| Example 9 | 0.010 | 0.050 | 0.025 | 0.085 | $5.75 \times 10^{-6}$ |
| Example 10 | 0.050 | 0.050 | 0.025 | 0.125 | $6.66 \times 10^{-6}$ |
| Example 11 | 0.050 | 0.100 | 0.010 | 0.160 | $1.59 \times 10^{-5}$ |
| Example 12 | 0.050 | 0.100 | 0.025 | 0.175 | $1.61 \times 10^{-5}$ |
| Example 13 | 0.100 | 0.100 | 0.025 | 0.225 | $6.95 \times 10^{-6}$ |
| Example 14 | 0.200 | 0.100 | 0.025 | 0.325 | $2.60 \times 10^{-6}$ |
| Example 15 | 0.300 | 0.100 | 0.025 | 0.425 | $1.06 \times 10^{-6}$ |
| Example 16 | 0.600 | 0.100 | 0.025 | 0.725 | $1.00 \times 10^{-8}$ |
| Example 17 | 0.900 | 0.100 | 0.025 | 1.025 | $7.21 \times 10^{-9}$ |
| Example 18 | 1.200 | 0.100 | 0.025 | 1.325 | $4.29 \times 10^{-9}$ |
| Example 19 | 1.500 | 0.100 | 0.025 | 1.625 | $4.23 \times 10^{-9}$ |

In the table, "*1" in the column of "Ionic conductivity" shows that it was impossible to measure an ionic conductivity due to high resistance.

TABLE 2

| | $Li_{6-x-y-z}Y_{1-y-z}C_xZr_yCe_zB_{3-x}O_9$ | | | | Peak position | Lattice volume |
|---|---|---|---|---|---|---|
| | x | y | z | x + y + z | (°) | (Å) |
| Example 1 | 0.050 | 0.000 | 0.000 | 0.050 | 27.96 | 755.81 |
| Example 2 | 0.200 | 0.000 | 0.000 | 0.200 | 27.99 | 754.79 |
| Example 3 | 0.050 | 0.200 | 0.000 | 0.250 | 27.99 | 753.43 |
| Example 4 | 0.050 | 0.400 | 0.000 | 0.450 | 28.04 | 752.59 |
| Example 5 | 0.050 | 0.000 | 0.200 | 0.250 | 27.91 | 758.51 |
| Example 6 | 0.050 | 0.000 | 0.400 | 0.450 | 27.92 | 757.33 |
| Example 7 | 0.050 | 0.010 | 0.025 | 0.085 | 27.98 | 755.54 |
| Example 8 | 0.050 | 0.050 | 0.010 | 0.110 | 27.99 | 753.97 |
| Example 9 | 0.010 | 0.050 | 0.025 | 0.085 | 28.00 | 753.72 |
| Example 10 | 0.050 | 0.050 | 0.025 | 0.125 | 28.02 | 753.55 |
| Example 11 | 0.050 | 0.100 | 0.010 | 0.160 | 28.00 | 753.00 |
| Example 12 | 0.050 | 0.100 | 0.025 | 0.175 | 28.03 | 752.65 |
| Example 13 | 0.100 | 0.100 | 0.025 | 0.225 | 28.00 | 753.36 |
| Example 14 | 0.200 | 0.100 | 0.025 | 0.325 | 27.96 | 754.39 |
| Example 15 | 0.300 | 0.100 | 0.025 | 0.425 | 27.96 | 755.55 |
| Example 16 | 0.600 | 0.100 | 0.025 | 0.725 | 27.96 | 755.97 |
| Example 17 | 0.900 | 0.100 | 0.025 | 1.025 | 27.98 | 755.53 |

TABLE 2-continued

| | $Li_{6-x-y-z}Y_{1-y-z}C_xZr_yCe_zB_{3-x}O_9$ | | | | Peak position | Lattice volume |
|---|---|---|---|---|---|---|
| | x | y | z | x + y + z | (°) | (Å) |
| Example 18 | 1.200 | 0.100 | 0.025 | 1.325 | 27.99 | 755.35 |
| Example 19 | 1.500 | 0.100 | 0.025 | 1.625 | 27.95 | 754.88 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ion conductive solid comprising an oxide represented by Formula $Li_{6-x-y-z}Y_{1-y-z}C_xZr_yCe_zB_{3-x}O_9$, wherein in the formula, x, y and z are real numbers satisfying $0.010 \leq x \leq 1.500$, $0.000 \leq y \leq 0.400$, and $0.000 \leq z \leq 0.400$.

2. The ion conductive solid according to claim 1, wherein the x is $0.010 \leq x \leq 0.900$.

3. The ion conductive solid according to claim 1, wherein the x is $0.010 \leq x \leq 0.600$.

4. The ion conductive solid according to claim 1, wherein the x is $0.010 \leq x \leq 0.300$.

5. An all-solid-state battery comprising at least:

a positive electrode;

a negative electrode; and an electrolyte, wherein at least one selected from the group consisting of the positive electrode, the negative electrode and the electrolyte comprises the ion conductive solid according to claim 1.

6. The all-solid-state battery according to claim 5, wherein at least the electrolyte comprises the ion conductive solid.

* * * * *